United States Patent [19]

Houston et al.

[11] 4,204,628
[45] May 27, 1980

[54] METHOD FOR THERMO-COMPRESSION DIFFUSION BONDING

[75] Inventors: Douglas E. Houston, Ballston Lake; James A. Loughran, Scotia, both of N.Y.

[73] Assignee: General Electric Company, Schenectady, N.Y.

[21] Appl. No.: 927,346

[22] Filed: Jul. 24, 1978

[51] Int. Cl.² ............................................. B23K 19/00
[52] U.S. Cl. ...................................... 228/106; 228/193
[58] Field of Search ................ 228/106, 193, 212, 243

[56] References Cited

U.S. PATENT DOCUMENTS

| | | | |
|---|---|---|---|
| 3,128,419 | 4/1964 | Wäldkotter et al. | 357/81 |
| 3,273,029 | 9/1966 | Ross | 357/65 |
| 3,295,089 | 12/1966 | Moore | 357/65 |
| 3,633,267 | 1/1972 | Deminet et al. | 228/106 |
| 3,650,454 | 3/1972 | Coucoulas | 228/106 |
| 3,886,647 | 6/1975 | Alexander | 228/193 |

FOREIGN PATENT DOCUMENTS

| | | | |
|---|---|---|---|
| 2418106 | 11/1975 | Fed. Rep. of Germany | 228/106 |
| 1365289 | 8/1974 | United Kingdom | 228/106 |

*Primary Examiner*—Daniel C. Crane
*Attorney, Agent, or Firm*—Marvin Snyder; James C. Davis

[57] ABSTRACT

An improved method for thermo-compression diffusion bonding allows bonding of a compliant metallic member to a second metallic member which may have surface irregularities. Opposite surfaces of the compliant metallic member are contacted by a layer of compactible material and by the second metallic member, respectively, such that distribution of a loading force applied to this assembly conforms the compliant member to the irregularities in the surface contour of the second metallic member. Thus, a uniform substantially void-free diffusion bond between the two metallic members is achieved.

6 Claims, 5 Drawing Figures

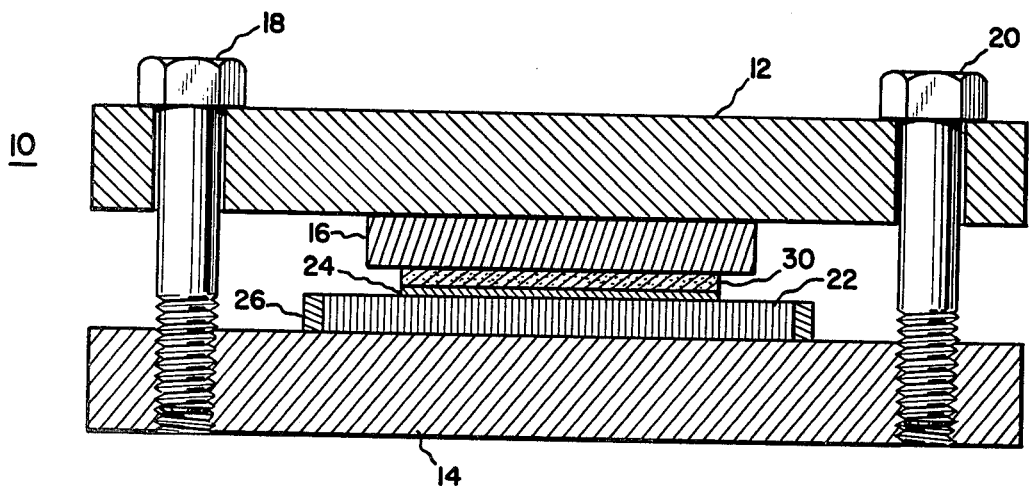
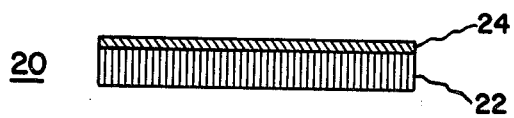
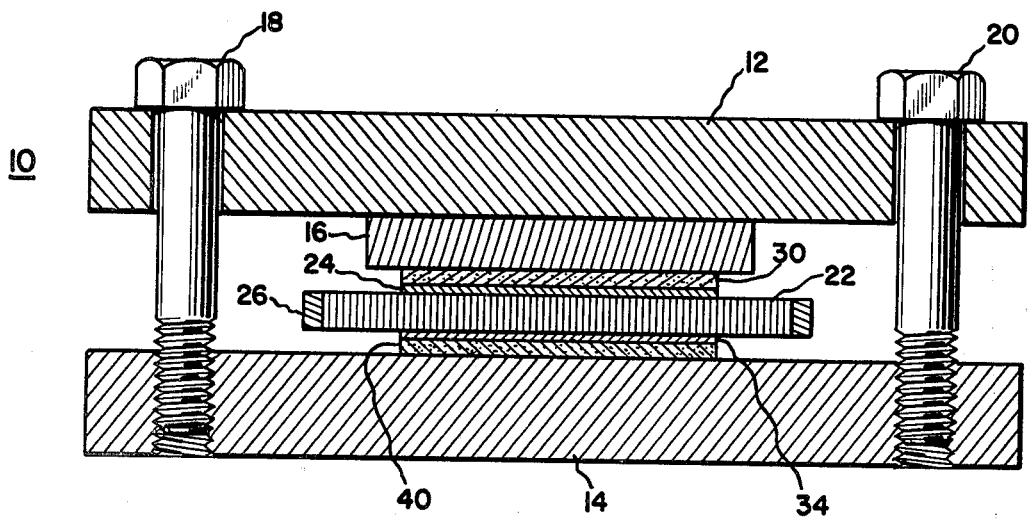
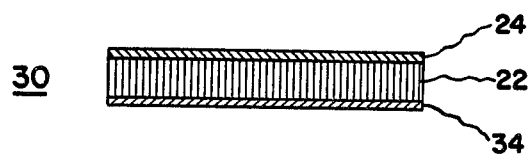

METHOD FOR THERMO-COMPRESSION DIFFUSION BONDING

BACKGROUND OF THE INVENTION

This invention relates to methods for diffusion bonding metallic surfaces and, more particularly to improved thermo-compression diffusion bonding of a compliant metallic surface to a metallic surface which may have surface irregularities.

DESCRIPTION OF THE PRIOR ART

When attaching metal surfaces together by diffusion bonding, it is often desirable that bonding take place at as low a temperature as possible. Such is the case when structured copper (a bundle of essentially straight filamentary strands of copper packed closely together) is thermo-compression diffusion bonded to a metallic foil. If structured copper is so bonded at high temperatures, the individual strands of the structured copper tend to bond to each other. Once this occurs, the strands are not free to individually contract and expand with changes in temperature, thereby negating the desirable stress relieving properties of structured copper.

Thermo-compression diffusion bonding has been accomplished at relatively low temperatures by using the diffusion bonding press of Douglas E. Houston disclosed in his U.S. patent application Ser. No. 889,099, filed Mar. 22, 1978, now abandoned in favor of Continuation-part-Part application Ser. No. 927,344, filed July 24, 1978, and assigned to the instant assignee. Houston describes and claims a diffusion bonding press and method of using this press to bond a metallic foil to a structured copper strain buffer disk. Bonding such foil to a structured copper disk greatly increases the structural integrity of the disk without impairing its thermal conductivity or stress relieving capability. However, voids (unbonds) in this diffusion bond may result if the surfaces to be bonded together are not relatively flat. It is difficult to obtain flat surfaces on disks of structured copper because structured copper inherently deforms easily. A flat surface may be achieved on a structured copper disk by grinding the surface; however, such step is relatively expensive. It can be seen that voids or unbonds in a diffusion bond between structured copper and a metallic foil may result if the method of bonding fails to cause the bonding surface of the structured copper to be flat or if the method fails to compensate for irregularities in the contour of the surface of the structured copper when they occur. It will be apparent to those skilled in the art that improved electrical and thermal performance is to be gained by elimination of voids in thermo-compression diffusion bonds.

It is one object of this invention to provide a method for thermo-compression diffusion bonding a compliant metallic member to another metallic member which results in uniform, void-free diffusion bonds between these members.

It is also an object of this invention to provide a method for creating a thermo-compression diffusion bond in which the bonded members do not adhere to the diffusion bonding press.

A further object of the invention is to eliminate or substantially reduce the number and size of voids in a thermo-compression diffusion bond between two metal surfaces.

BRIEF SUMMARY OF THE INVENTION

Briefly, in accordance with one preferred embodiment of the invention, a method for thermo-compression diffusion bonding a first compliant metallic member including relatively flat opposed surfaces to a second metallic member including relatively flat opposed surfaces which may have surface irregularities comprises positioning one of the opposed surfaces of the first metallic member in substantial abutment with one surface of the second metallic member. Further, a layer of nonreactive compactible material positioned above and in contact with the remaining surface of the first metallic member. The so-positioned compactible material layer and metallic members are surrounded by an inert atmosphere. A loading force applied to the so-positioned metallic members squeezes them together at high pressure while they are heated at a temperature within the range of 300° C.–400° C. As a result, the compactible material compresses and causes the first compliant metallic member to conform to the irregular surface contour of the second metallic member, producing a uniform, substantially void-free thermo-compression diffusion bond between the two members.

The features of the invention believed to be novel are set forth with particularity in the appended claims. The invention itself, however, both as to organization and method of operation, together with further objects and advantages thereof, may best be understood by reference to the following description taken in conjunction with the accompanying drawings.

DESCRIPTION OF THE DRAWINGS

FIG. 2 is a side view of a cross section of a thermo-compression bonding press showing materials situated in the press in practicing the method of the invention.

FIG. 3 illustrates a structured copper disk with a metallic foil thermo-compression diffusion bonded to one side thereof.

FIG. 4 is a side view of a cross section of a diffusion bonding press showing materials including two layers of compactible material situated in the press when practicing the method of the invention.

FIG. 5 illustrates a structured copper disk with a separate metallic foil thermo-compression diffusion bonded to each of the top and bottom surfaces thereof.

DETAILED DESCRIPTION OF THE PREFERRED EMBODIMENT

Figure 1:
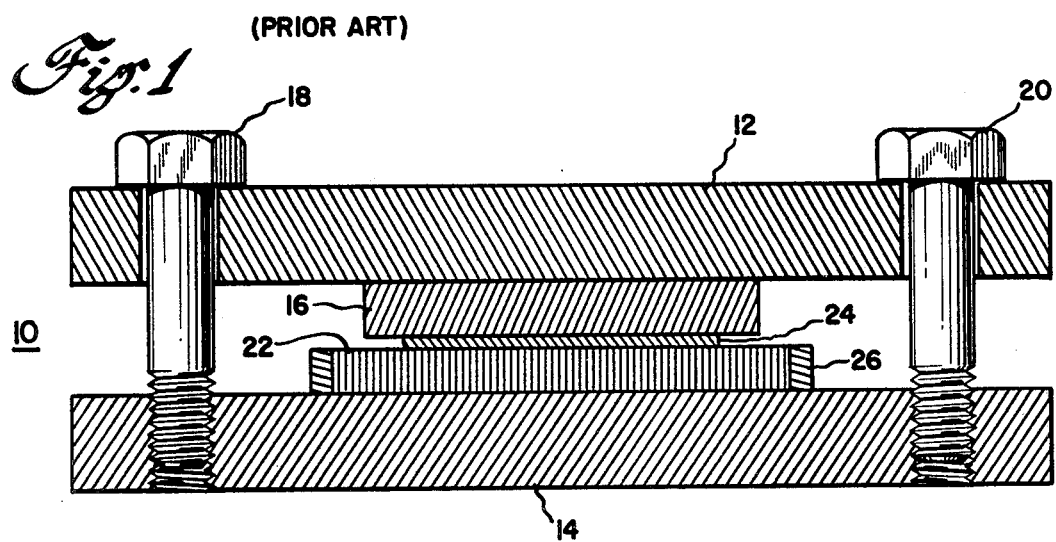
FIG. 1 is a side view of a cross section of a thermo-compression diffusion bonding press used to practice diffusion bonding methods of the prior art.

The invention comprises an improvement in the method of thermo-compression diffusion bonding metallic surfaces together. FIG. 1 shows a diffusion bonding press 10 which has been used in methods of the prior art for creating thermo-compression diffusion bonds. A diffusion bonding press such as press 10 is described and claimed in the aforementioned D. E. Houston U.S. patent application Ser. No. 889,099, now abandoned. Diffusion bonding press 10 is comprised of an upper metallic plate 12 oriented parallel to lower metallic plate 14 with a space provided therebetween. Metallic pressing block 16 is positioned at the center of the side of upper plate 12 facing lower plate 14. Metallic bolts 18 and 20 pass through respective holes in upper plate 12 and lower plate 14 and are threaded into lower plate 14 to connect the two plates together as illustrated in FIG. 1.

Metallic bolts 18 and 20 are comprised of a steel other than stainless steel, while upper plate 12, lower plate 14 and metallic pressing block 16 are comprised of stainless steel. To achieve a thermo-compression diffusion bond between structured copper disk 22 and a compliant metallic member such as thin metallic sheet or foil 24, it is necessary to position metallic foil 24 in contact with the upper surface of structured copper disk 22 as shown in FIG. 1 and situate the combined structure of disk 22 and foil 24 between metallic pressing block 16 and lower plate 14 of press 10. (The term "compliant" as used herein is intended to apply to any relatively thin metallic member which is deformable). A conventional press is used to squeeze upper plate 12 and lower plate 14 together and while such pressure is applied to these plates, bolts 18 and 20 are tightened.

The thermo-compression diffusion bond between structured copper disk 22 and metallic foil 24 is actually formed when press 10 containing this disk-foil assembly is placed in an inert atmosphere and heated at a temperature within the range of 300° C.–400° C., typically 350° C. for approximately 15 minutes to 5 hours. When press 10 is so heated, upper plate 12, lower plate 14 and metallic pressing block 16 expand to a greater total extent than do metallic bolts 18 and 20. Thus, a force typically ranging from 20,000 to 50,000 psi is exerted between pressing block 16 and lower plate 14 resulting in the squeezing of metallic foil 24 and structured copper disk 22 together and the thermo-compression diffusion bonding of each to the other. Structured copper disk 22 and metallic foil 24 diffusion bonded thereto are removed from press 10. Retaining ring 26 (which encircles structured copper disk 22 to provide it with structural integrity prior to the bonding of the metallic foil thereto) is removed from structured copper disk 22 and any loose strands of copper are likewise removed. This forms a structured copper strain buffer with outward appearance similar to strain buffer 20 shown in FIG. 3 to be later discussed.

When using the above-described method and press for diffusion bonding, it is important that the surfaces of the metallic members to be bonded together are flat and parallel to each other and to lower plate 14 and pressing block 16. It is difficult to obtain flat surfaces on disks of structured copper because structured copper deforms easily. Typically, a disk or other geometric form of structured copper has surface variations ranging from approximately 1 to 3 mils in thickness. These surface irregularities may result in unbonds or voids in a diffusion bond as large as approximately 2 cm. in diameter when thermo-compression diffusion bonding is attempted between a structured copper member with an irregular surface and a compliant metallic member such as metallic foil. These voids occur because the flat rigid surface of pressing block 16 which contacts metallic foil 24 is by itself incapable of pressing metallic foil 24 into the irregularities of the surface of structured copper disk 22 where the diffusion bond is intended to take place. Metallic foil 24 is thus not pressured into conforming completely with the contour of the bonding surface of structured copper disk 22. Further, diffusion bonding a compliant metallic member to a metallic member with surface irregularities using the above-described press and method may undesirably result in the compliant metallic member (such as metallic foil 24) adhering to pressing block 16. This result occurs because the compliant metallic member starts to diffusion bond to pressing block 16.

The two problems described in the preceding paragraph are solved by the improved thermo-compression diffusion bonding provided by the invention.

Referring now to FIG. 2, a diffusion bonding pressing including metallic members to be bonded together is shown which is similar in function and structure in all respects to that shown in FIG. 1 except that in accordance with the invention a layer of nonreactive compactible material 30 is situated between pressing block 16 and metallic foil 24 prior to application of the loading force which squeezes together compliant metallic foil 24 and irregularly surfaced metallic member 22 of structured copper. (the term "nonreactive" as used herein means chemically inactive in the sense that the described substance will not bond directly to metal.)

Layer 30 of compactible material may be comprised of glass wool or Glass Fiber Filter paper (available from Fisher Scientific Company, Clifton, N.J.) or other similarly compactible materials. If compactible layer 30 is comprised of glass wool, when diffusion bonding press 10 of FIG. 2 is heated in accordance with the above-described method, a differential expansion force squeezes the glass wool layer 30 and pulverizes it under compression. This compression results in a glass powder, the particles of which are redistributed, forcing metallic foil 24 to conform to irregularities in the contour of the surface of structured copper disk 22. Thus, substantially the entire surface of metallic foil 24 is forced into contact with the adjacent surface of structured copper disk 22 and is thermo-compression diffusion bonded thereto in a nearly void-free manner. This improved method of thermo-compression diffusion bonding yields a structure such as the structured copper strain buffer 20 of FIG. 3. FIG. 3 shows buffer 20 as it appears after retaining ring 26 and any loose strands of copper have been removed.

As mentioned above, the layer of compactible material 30 may comprise a "glass fiber filter" paper (a type of glass wool composed of tiny glass particles which have been pressed together). Typically, the thickness of such glass fiber filter paper is approximately 10 mils. Use of such a thickness of "glass fiber filter" paper results in substantially void-free diffusion bonds of metallic foil 24 to structured copper disk 22 which may have surface irregularities of up to approximately 1 to 3 mils. For surface irregularities in excess of 3 mils, multiple layers of "glass fiber filter" paper may be used to obtain void-free diffusion bonds. Generally, the thickness of the "glass fiber filter" paper is within the range of approximately 5 to 20 mils, depending upon the extent of the surface irregularities of structured copper disk 22.

The layer of compactible material 30 is nonreactive such that when subjected to the pressures of this thermo-compression diffusion bonding process, layer 30 does not adhere to pressing block 16 or metallic foil 24 and thus prevents metallic foil 24 from sticking to pressing block 16. Glass wool for layer 30 is inexpensive and easily obtained.

In actual practice, a layer of glass wool similar to layer 30 is positioned between structured copper disk 22 and lower plate 14 prior to application of the loading force. This prevents structured copper disk 22 from becoming bonded to lower plate 14 and undesirably adhering thereto.

FIG. 4 shows diffusion bonding press 10 arranged to form a thermo-compression diffusion bond between a metallic foil 24 and the top surface of a structured copper disk 22 and another thermo-compression diffusion bond between a metallic foil 34 and the bottom surface of structured copper disk 22. Providing a separate metallic foil diffusion bonded to each of the top and bottom surfaces of structured copper disk 22 further increases the structural integrity of the resultant structured copper strain buffer 30 as shown in FIG. 5.

The method for achieving the above-described diffusion bonds is identical to the improved method discussed above in which a diffusion bond was achieved between metallic foil 24 and structured copper disk 22, except for the following modifications. Prior to the application of the loading force, a layer of compliant material such as metallic foil 34 is situated in contact with the bottom surface of structured copper disk 22 as shown in FIG. 4. A layer of compactible material 40 similar to layer 30 is situated between and in contact with metallic foil 34 and lower plate 14. The subsequent steps in the method are carried out as before.

The foregoing describes a method for achieving a thermo-compression diffusion bond between a compliant metallic member and a structured copper disk having surface irregularities by using a layer of compactible material which causes the compliant metallic member under pressure to conform to the surface irregularities such that a uniform, substantially void-free diffusion bond is achieved. It should be noted that practice of the method of the invention is not limited to any one particular geometry of structured copper members, metallic foil members, or compactible material layers, such as a disk geometry set forth above as an example. Other geometries for these structures may alternatively be used, such as squares, rectangles and the like.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

We claim:

1. A method for thermo-compression diffusion bonding a first compliant metallic sheet including first and second opposed surfaces to one of first and second relatively flat opposed surfaces of a structured copper member which may have irregularities in the surface thereof, said structured copper member including a bundle of substantially parallel, closely packed strands of copper of substantially equal length, one common end of said strands forming said first relatively flat surface, the remaining common end of said strands forming said second relatively flat surface, said method comprising:
   positioning the second surface of said first metallic sheet in substantial abutment with the first surface of said structured copper member;
   positioning a first layer of compactible material above and in contact with the first surface of said first metallic sheet;
   positioning in a high pressure, differential thermal expansion type diffusion bonding press the assembly of said structured copper member, said first metallic sheet and said first layer of compactible material thus formed in preparation for squeezing said assembly together at high pressure;
   surrounding said assembly with an inert atmosphere; and
   heating said press and said assembly at a temperature within the range of 300° C. to 400° C. so as to cause said press to squeeze said assembly together at high pressure resulting in the thermo-compression diffusion bonding of said first metallic sheet to said structured copper member.

2. The method of claim 1 wherein the high pressure generated by said press as a result of said heating step is within the range of 20,000 to 50,000 psi.

3. The method of claim 1 wherein said compactible material comprises one of the group consisting of glass wool and glass fiber filter paper.

4. A method for thermo-compression diffusion bonding first and second compliant metallic sheets respectively to first and second opposed relatively flat surfaces of a structured copper member which may have irregularities in the surfaces thereof, said first and second compliant metallic members each including first and second opposed surfaces, said structured copper member including a bundle of substantially parallel, closely packed strands of copper of substantially equal length, one common end of said strands forming said first relatively flat surface, the remaining common end of said strands forming said second relatively flat surface, said method comprising:
   positioning the second surface of said first metallic sheet in substantial abutment with the first surface of said structured copper member;
   positioning the first surface of said second metallic sheet in substantial abutment with the second surface of said structured copper member;
   positioning a first layer of compactible material above and in contact with the first surface of said first metallic sheet;
   positioning a second layer of compactible material below and in contact with the second surface of said second metallic sheet;
   positioning in a high pressure, differential thermal expansion type diffusion bonding press the assembly of said structured copper member, said first and second metallic sheets, and said first and second layers of compactible material thus formed in preparation for squeezing said assembly together at high pressure;
   surrounding said assembly with an inert atmosphere, and
   heating said press and assembly at a temperature within the range of 300° C. to 400° C. so as to cause said press to squeeze said assembly together at high pressure, resulting in the thermo-compression diffusion bonding of said first and second metallic sheets to said structured copper member.

5. The method of claim 4 wherein the high pressure generated by said press as a result of said heating step is within the range of 20,000 to 50,000 psi.

6. The method of claim 4 wherein said first and second layers of compactible material are comprised of one of the group consisting of glass wool and glass fiber filter paper.

* * * * *